United States Patent [19]

Belart

[11] Patent Number: 5,000,002
[45] Date of Patent: Mar. 19, 1991

[54] BRAKE PRESSURE GENERATOR FOR A BRAKE SYSTEM EXHIBITING AN ANTI-LOCKING CONTROL

[75] Inventor: Juan Belart, Moerfelden-Walldorf, Fed. Rep. of Germany

[73] Assignee: Alfred Teves GmbH, Frankfurt am Main, Fed. Rep. of Germany

[21] Appl. No.: 413,900

[22] Filed: Sep. 28, 1989

[30] Foreign Application Priority Data

Oct. 1, 1988 [DE] Fed. Rep. of Germany ....... 3833551

[51] Int. Cl.$^5$ .............................................. B60T 13/00
[52] U.S. Cl. .................... 60/547.1; 60/581; 60/583; 92/48; 303/114; 303/119
[58] Field of Search ............... 92/48, 50; 60/547.1, 60/567, 568, 571, 581, 583; 303/114, 119

[56] References Cited

U.S. PATENT DOCUMENTS

| | | | |
|---|---|---|---|
| 4,571,943 | 2/1986 | Gaiser | 92/50 |
| 4,576,004 | 3/1986 | Bach | 62/547.1 |
| 4,659,153 | 4/1987 | Klein | 303/119 |
| 4,660,898 | 4/1987 | Steffes | 303/119 |
| 4,702,531 | 10/1987 | Kircher et al. | 303/114 |
| 4,708,401 | 11/1987 | Klein | 60/581 |
| 4,729,610 | 3/1988 | Seibert et al. | 60/547.1 |
| 4,729,611 | 3/1988 | Kircher et al. | 60/547.1 |
| 4,914,917 | 4/1990 | Schonlau | 60/547.1 |

Primary Examiner—Ronald C. Capossela
Attorney, Agent, or Firm—Robert P. Seitter; J. Gordon Lewis

[57] ABSTRACT

A brake pressure generator for brake systems exhibiting an anti-locking control comprises a vacuum brake force booster (1), and a master brake cylinder (2) coupled upstream thereto, a vacuum counter-force generator (6 or 6') and a hydraulic force converter (27). The pressure and the pressure difference, respectively, in chambers (15 or 15'; 16 or 16') of the counter-force generator (6 or 6') are controlled with the aid of electrically reswitchable multi-way valves (17 to 17') in communication with the atmosphere (Atm) and the vacuum (Vac) source.

8 Claims, 3 Drawing Sheets

BRAKE PRESSURE GENERATOR FOR A BRAKE SYSTEM EXHIBITING AN ANTI-LOCKING CONTROL

BACKGROUND OF THE INVENTION

The present invention is concerned with an anti-lock brake system for use with automotive vehicles and, more particularly, to such a system comprising a master brake cylinder coupled upstream of which is a vacuum brake force booster and means for generating a restoring force counter-acting the brake applying force. The means for generating a restoring force is caused by vacuum and is controllable with the aid of multi-way valves.

A brake system of the afore-described type is disclosed, for example, by U.S. Pat. No. 4,702,531 issued Oct. 27, 1987 (corresponding to German DE-Offenlegungsschrift No. 33 17 629) and U.S. Pat. No. 4,659,153 issued Apr. 21, 1987 (corresponding to German DE-Offenlegungsschrift No. 34 28 869). These systems in the event of an excessive pedal force during an anti-lock controll will generate a counter-acting force by changing or even inverting the pressure conditions in the vacuum brake force booster with the aid of electromagnetically controllable multi-way valves. The hydraulic pressure in the master brake cylinder, downstream of the brake force booster, is reduced by that counter-force. Through equally electromagnetically controllable multi-way valves provided in the hydraulic conduits leading to the individual wheel brakes, the previously attained pressure in the wheel brakes, is maintained or reduced to the pressure level in the master brake cylinder decreased by the said counter-acting force. The pressure in the individual wheel brakes is cyclically successively adjusted to the valve computed by the electronic controller according to the so-called multiplex process.

In the state-of-the-art brake systems it is difficult to vary the brake pressure in the individual wheel brakes sufficiently fast and to apply the auxiliary energy required when vacuum serves as an energy source for generating the brake force boosting and the restoring force acting in a direction opposite the pedal force. Moreover, the size of the servo assemblies required is restricted for cost-saving reasons and by space limitations.

The problem underlying the invention, therefore, resides in overcoming the above mentioned disadvantages while providing a brake system operating with the vacuum usually available in automotive vehicles operating with Otto engines, requiring relatively little space when it is installed and permitting comparatively low-cost manufacture. These requirements should be complied with without sacrificing the efficiency of the brakes or the anti-locking control.

SUMMARY OF THE INVENTION

It has now been found that this problem can be solved by a brake pressure generator of the afore-described type if a vacuum counter-force generator and a hydraulic force converting means increasing the counter-force for generating the restoring force are provided in the force transmission path of the brake applying force to the brake force booster.

Because of the configuration of the brake pressure generator according to this invention, a compact system is provided complying with all the requirements placed upon it.

Other advantages are realized by the provision of a hydraulic force converting means capable of converting the force applied by the vacuum counter-force generator into a restoring force high enough to compensate the high pedal force applied to the brake pedal in panic decelerations (panic stops).

According to an advantageous form of the invention, the vacuum counter-force generator is of a design similar to that of the vacuum brake force booster. That is, the former comprises: a working piston separating two chambers: in the releasing or initial position of the counter forc generator there is a pressure equilibrium; and in the working position, there is a pressure difference causing a counter-acting force which acts through the annular or front face of a piston in a working chamber of the force converter and causes a hydraulic pressure acting on an actuating piston in the resetting direction. This actuating piston is located in an axially displacable manner.

Hence, a servo-system is used as a counter-force generator and is similar to the highly proven and extremely reliable state of the art vacuum brake force booster. Corresponding reliability and relatively low manufacturing costs can be expected.

Also, it is possible for the working piston of the counter force generator and the piston generating pressure in the working chamber of the force converter, to be rigidly interconnected or to be integrally formed.

According to another embodiment of the invention the brake pressure generator is arranged so that atmospheric pressure prevails in the two chambers of the counter-force generator in the releasing position thereof. Vacuum is developed, with the aid of multi-way valves, in the chamber of the counter-force generator near the force converter for generating the counter-force. Conversely, it is also possible for the brake pressure generator to be designed such that, in its releasing position, vacuum prevails in both chambers. Pressure is raised in the chamber of the counter-force generator remote from the force converter for the counter-force generation.

It has proved to be particularly advantageous to form the brake force booster, including the master brake cylinder coupled downstream thereof, the counter-force generator and the force converter as a compact unit and to provided the same with a central actuating piston disposed in a cylinder in an axially manner displacable. In this form the actuating piston transfers the brake actuating force from a brake pedal to the brake force booster. An annular chamber is formed around the periphery of the actuating piston and a hollow-cylindrically shaped piston, connected with the working piston of the counter-force generator, extends into the annular chamber which thus serves as a working chamber of the hydraulic force converter. Feasibly, in this form of embodiment, the annular chamber is in communication with a pressure equilibrium reservoir through a check valve, closed in case of over-pressure in the annular chamber and open in the releasing position of the counter-force generator by means of a stop on the piston extending into the annular chamber The volume (space requirements) of a brake pressure generator of this type only slightly exceeds that of a conventional brake force booster including its associated master brake cylinder. For this reason it can easily be assembled in an automotive vehicle. According to one embodiment of the invention, the transmission ratio of the force converting means, at which the counter-force supplied through the annular face of the plunging piston, is transferrable to the actuating piston is in a range of about between 1:2 and 1:5.

BRIEF DESCRIPTION OF THE DRAWING

Further features, advantages and use of the invention will be understood from the following detailed description taken with reference to the figures of the attached drawing, wherein.

DETAILED DESCRIPTION

Figure 1:
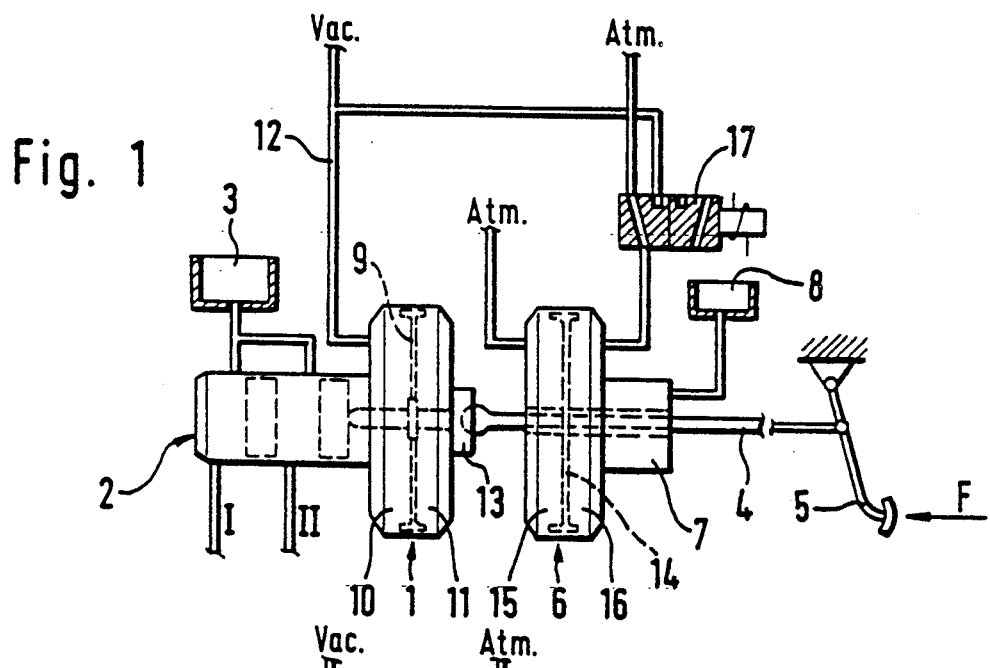
FIG. 1 shows, schematically, one embodiment of a brake pressure generator according to the invention.

As shown by FIG. 1 of the drawing, a brake pressure generator according to this invention substantially comprises a conventional brake force booster 1 including a master brake cylinder 2 coupled downstream thereof, a counter-force generator 6 and a force booster 7 for boosting the counter-force developed by the generator 6. In the embodiment illustrated, the master brake cylinder 2 is a tandem master brake cylinder connected to two brake circuits I, II of any conventional arrangement. A pressure fluid reservoir 3 is also shown and is associated with the chambers of the tandem master brake cylinder 2. The force converting means 7 is also provided with a pressure equilibrium reservoir 8 that can, if desired, be combined with reservoir 3.

The brake applying force or pedal force F is exerted on a brake pedal 5 of the automotive vehicle through a push rod 4 extending through the counter-force generator 6 and the force converting means 7 and is transmitted to the brake force booster 1. As long as the counter-force generator 6 is inoperative, i.e. during standard non-controlled braking operations, the axial displacement of the push rod 4, and, hence, the brake force transmission and brake relief, is not impeded by the counter-force generator 6 and the force converting means 7.

The brake force booster 1, is of a type known in the art and includes two chambers 10 and 11 separated by a working piston 9 or, if desired, by a diaphragm. Vacuum prevails in both chambers in the brake release position, with the first chamber 10 being in direct communication with a vacuum source Vac through a conduit 12 and with the second chamber 11 being in communication with chamber 10 through a conduit (not shown) in the interior of the booster 1. As is well known, when applying the brake, the communication from chamber 10 to chamber 11 is interrupted and communication of the latter chamber with the atmosphere (Atm) is established trough a control housing 13. The pressure in the chamber 11 thus increases to atmospheric pressure at the most. The force exerted by this pressure difference on the piston 9 is transmitted, in a known manner, to the working pistons (shown in dotted lines) within the interior of the master brake cylinder 2.

Usually, the intake tube of the Otto engine of the automotive vehicle serves as a vacuum source Vac.

If needed, a counter-force acting in a direction opposite the pedal force F and compensating the same in whole or in part is generated by the counter-force generator 6 which is of a design very similar to that of the brake force booster 1. The counter-force generator 6 also includes a working piston 14 or diaphragm separating two chambers 15 and 16 in the interior of the counter-force generator. In the release position of the counter-force generator 6, atmospheric pressure prevails in both chambers 15, 16 because chamber 15 is in direct communication with the ambient pressure Atm and chamber 16 is in communication therewith through an electromagnetically operated multi-way valve 17. In the release or rest position of the counter-force generator 6, as shown in the drawing, valve 17 takes its basic or normal position. If a counter-force acting in a direction opposite the pedal force F is needed, the multi-way valve 17 is switched over to connect the chamber 16 with the vacuum source Vac. thereby causing a vacuum in the chamber 16. Atmospheric force in chamber 15 opposes the brake applying force F acting on piston 14. That atmospheric force, in the force converter 7, is hydraulically increased to an extent such that, in case of a strong pedal actuation, the brake applying force F can be substantially or completely compensated.

Figure 4:
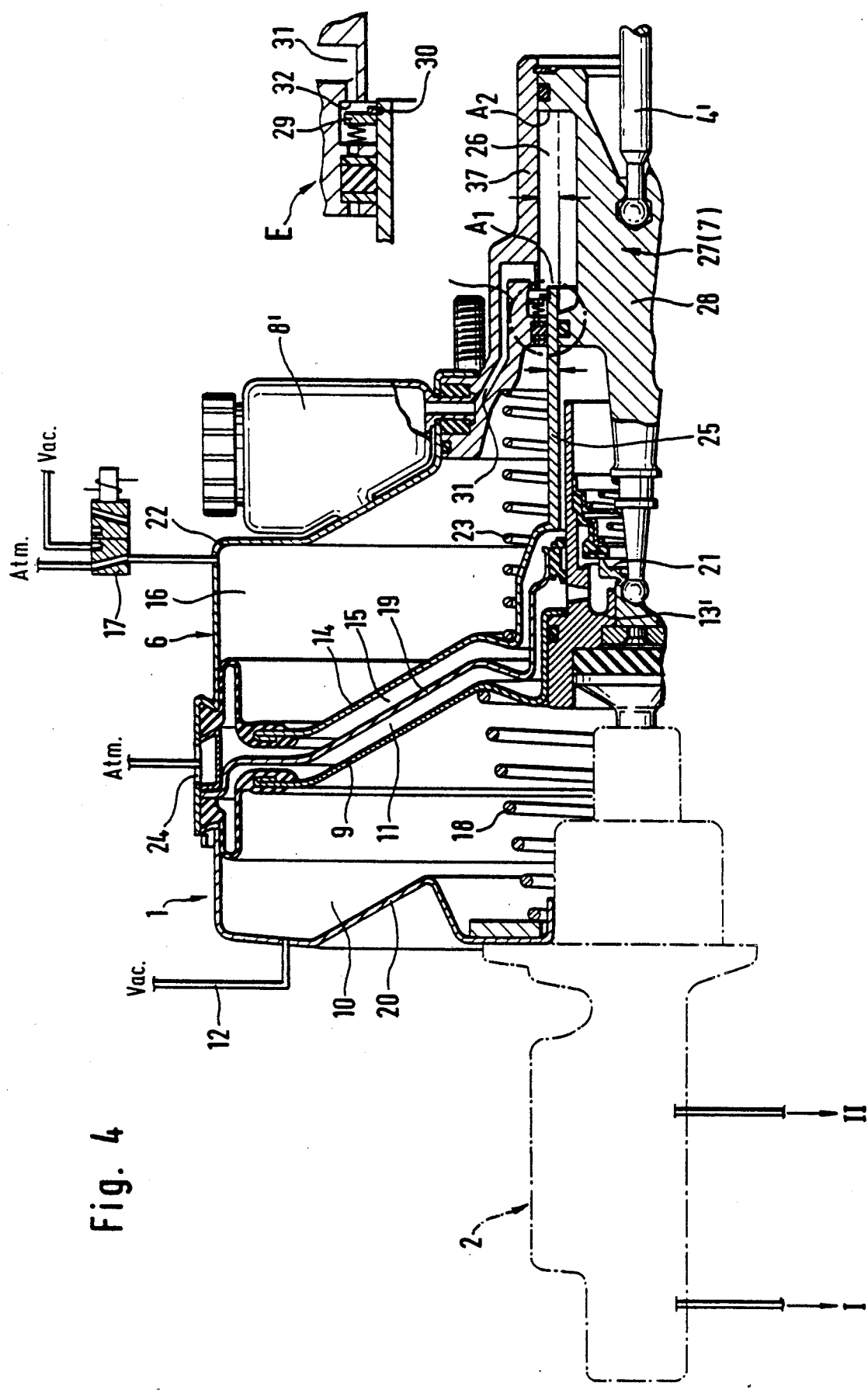
FIG. 4 is a vertical section view of a brake pressure generator as shown in FIG. 3, but showing the embodiment according to FIG. 1.
Figure 5:
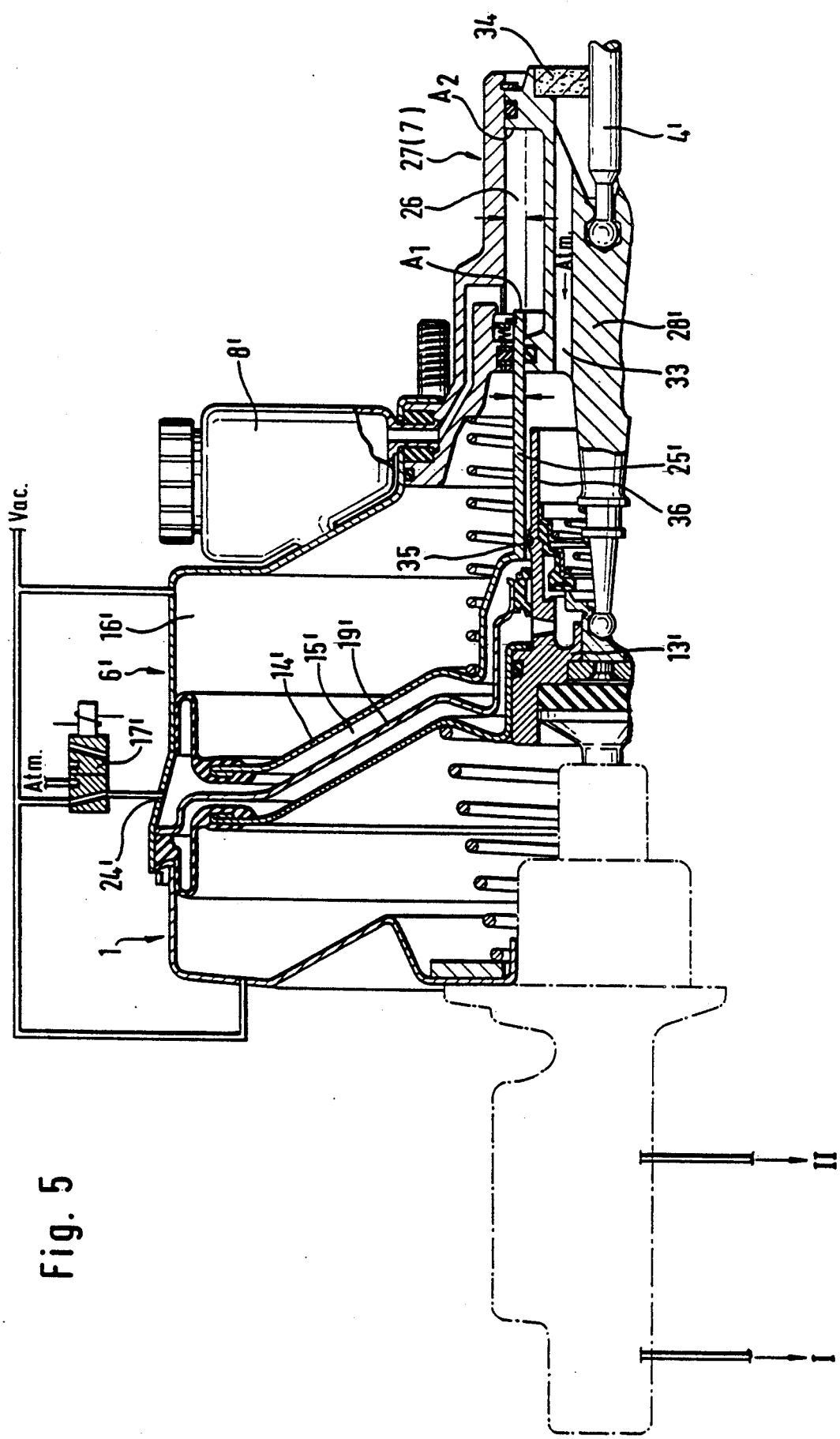
FIG. 5 is a vertical section view of a brake pressure generator as shown in FIG. 3, but showing the system according to FIG. 2.

The force converter 7 includes a valve means (not shown in FIG. 1) permitting, as long as the counter force is zero, a non-impeded force transmission from pedal 5 to brake force booster 1. This value means provides for the counter-force to be connected as soon as the counter-force generator 6 becomes operative. FIGS. 4 and 5 show details of embodiments for realizing these functions.

Figure 2:
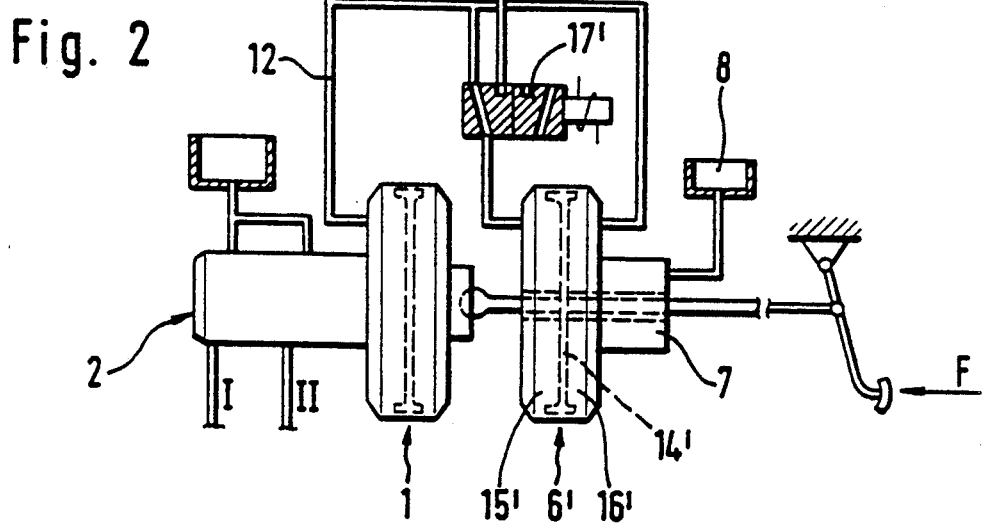
FIG. 2 shows, in a schematic illustration similar to FIG. 1 another embodiment of the invention.

The brake pressure generator according to FIG. 2 distinguishes from the one according to FIG. 1 substantially only by the pressure equilibrium conditions in the counter-force generator 6'. Thus, like reference numerals will be used for like parts and the prime designation will be used for modified parts or parts of altered operation. In the release position of the counter force generator 6', vacuum prevails in both chambers 15' and 16' as opposed to the arrangement of the counter-force generator 6 in FIG. 1. Consequently, for generating the desired restoring force or counter-force to the brake applying force F, the pressure in chamber 15', remote from the pedal, is increased by switching over the multi-way valve 17' to connect the chamber 15' to the atmosphere (Atm connection).

Figure 3:
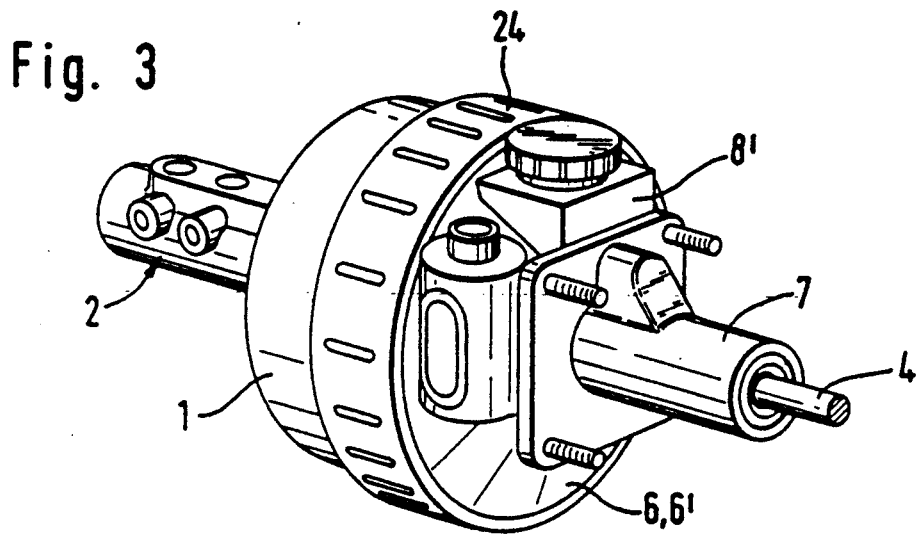
FIG. 3 is a perspective view illustrating the external view of a particularly compact brake pressure generator according to the invention.

FIG. 3 illustrates how to combine the components schematically shown in FIGS. 1 and 2 to form a compact brake pressure generator of a size only very slightly larger than a state-of-the-art vacuum brake force booster. Structural details and the way of operation of the brake force generator physically constructed according to FIG. 3 are shown by FIGS. 4 and 5. For the sake of an easier understanding, in the various drawings, the same or corresponding reference numerals have been used for identical parts although the schematic illustration of FIGS. 1 and 2 differs from the structural illustration in FIGS. 3 to 5.

In FIG. 4, the conventional vacuum brake force booster and the master brake cylinder coupled downstream thereof, respectively, are again designated by numerals 1 and 2, respectively, but part of the booster and all of the master cylinder are illustrated in dotted lines. The two brake circuits carry the reference characters I and II. The brake force booster 1 and the counter-force generator 6 are in direct series arrangement and are assembled to form an integral unit. The two servo systems are separated by a stationary housing wall 19 which together with a front portion 20 in abutment with the master brake cylinder 2, encloses the two chambers 10, 11 of the brake force booster 1.

The two chambers 10 and 11, in the interior, are separated by the working piston 9 held by a compression spring or piston restoring spring 18 in the initial position as shown in the brake release position. The vacuum source Vac. through conduit 12, is in communication with chamber 10. The two chambers 10 and 11, through a passageway (not shown for clarity's sake) in the control housing 13 are interconnected in the brake release position, as shown, so that vacuum prevails in both chambers. When applying the brake, the said passageway is closed by conventional means known to those skilled in the art, to release an opening to the atmosphere through a poppet valve 21, also in known manner, depending on the level of the brake applying force F (shown in FIG.1).

The counter-force generator 6 according to the invention is confined by the wall 19 and by a housing wall 22. The working piston 14 of the said counter-force generator 6 separates the two chambers 15 and 16 and is normally positioned as shown by a compression spring 23 in the same manner as piston 9 of the brake force booster 1. FIG. 4 shows the rest or release position of the counter-force generator 6. Air under atmospheric pressure flows into chamber 15 (and from there to the control housing 13) through passage openings 24 sizes and shapes of which are shown in FIG. 3. Admittance of air to chamber 16 or the build-up of vacuum in this chamber is controlled—as already described with reference to FIG. 1—by an electromagnetically controlled multi-way valve 17 which, in the present instance is a 3-way/2-position valve.

The working piston 14 of the counter-force generator 6 transfer the force exerted thereon to an axially displaceable sleeve and a hollow-cylindrical piston 25 the right-hand end (as shown in the drawing) extends into a working chamber 26 of a force converter generally designated by numeral 27. The counter-force caused by the counter-force generator 6 is converted by the said force converter at the ratio of the area of front face $A_1$ of the piston 25 to a face of application and the area of an annular face $A_2$ in the working chamber 26. The increased counter-force is transferred to a piston 28 which, in an axially displaceable (slideable) manner, is disposed within a cylindrical housing portion 37 of the brake pressure generator. The actuating piston 28 is operative to transfer the pedal force from the brake pedal (not shown in FIG. 4), through push rod 4', to the control valve 13 of the brake force booster 1. The pedal force F is, therefore, compensated in whole or in part by the counter-force converted and thereby increased.

Detail E, shown in an enlarged scale in a portion of FIG. 4, is a check valve. In the release position is shown, of the counter-force generator 6, a valve member 29 of the check valve is kept open by a stop 30 on piston 25 connecting the working piston 14 of the counter-force generator 6 to the force converter 27. A pressure fluid conduit 31 connects the working chamber 26 to the pressure compensation reservoir 8' and, in the release position of the counter-force generator, this conduit remains open. The actuating piston 28 can, therefore, be axially displaced unimpedely.

However, once the counter-force generator 6 becomes operative, the piston 25 will be displaced to the right (as shown in the drawing). As the piston 25 extends into the working chamber 26 the valve member 29 is placed on the valve seat 32 and closes the pressure fluid conduit 31 to reservoir 8'. The resultant pressure in the working chamber 26, through the actuating piston 28, acts as a restoring force acting in a direction opposite the pedal force F.

An embodiment of the invention operating accordingly illustrates the principle described with reference to FIG. 2. As oppposed to the example of embodiment according to FIG. 4, in the release position of the counter-force generator 6', vacuum prevails in both chambers 15' and 16'. For generating the counter-force, the pressure in chamber 15' will, therefore, have to be increased by switching the electromagnetically operated 3-way/2-position valve 17'.

As chamber 15' between the housing wall 19' and the working piston 14', as opposed to the design according to FIG. 4, is not in permanent communication with the atmosphere, the air admission to the control valve 13' is now effected through a passageway 33 in the actuating piston 28'. The passageway 33, includes an air filter 34. A gasket 35 is provided between a nozzle 36 of the control housing 13' and the piston 25' to preclude admission of air to the chamber 15' under vacuum. The embodiment of FIG. 5 corresponds generally to the one according to FIG. 4 and like reference numerals have been used for like parts.

The operation of the brake pressure generator according to the invention is as follows:

In standard, non-controlled braking operations, the counter-force generator 6 or 6' remains in its brake release position. When applying the brake and displacing the working piston 28 or 28', pressure fluid from the working chamber 26 of the brake force converter is displaced into the reservoir 8' under atmospheric pressure and it flows back when the brake is released. Transfer of the pedal force F to the brake force booster 1 is not affected.

When an electronic unit (not shown), part of a brake system exhibiting an anti-locking control, detects a locking tendency requiring a brake pressure reduction, the multi-way valve 17 or 17' is switched by one or more pulses for a predetermined period of time calculated by the electronic unit thereby activating the counter-force generator. The displacement of the working piston 14 or 14' to the right in the drawing as described results in an axial displacement of the annular piston 25 in the same direction. The valve 29 and 32 (shown in Detail E) closes so that hydraulic pressure can be developed in the working chamber 26 by the movement of piston 25. This pressure acts on the actuating piston 28 or 28' in the restoring direction.

A hydraulic force converter 27 configured so that the force exerted by the hollow-cylindrical piston 25 is increased approximately at the ratio of between 2:1 and 5:1 only a relatively low auxiliary energy is required for the effective reduction of the brake pressure in the brake circuits I, II of the master brake cylinder 2. This is because of the force applied by the development (by the vacuum source) of the pressure difference between the two chambers of the counter-force generator 6 or 6'. Although the counter-force conversion is combined with a corresponding increase in the pedal travel, the required stroke of the working piston 14 or 14' of the counter-force generator 6 or 6' is relatively low because a minor volume displacement results in an adequate pressure decrease in the wheel brakes. No lost motion arrangement need be overcome in applying the brakes until brake management has occurred. An adequate stroke of the pistons in the counter-force generator can, therefore, be attained with relatively low volume or space requirements with respect to the counter-force generator and, hence, of the brake pressure generator as a whole. This too, is a highly significant practical advantage.

What is claimed is:

1. A brake pressure generator for use with an antilocking brake system for automotive vehicles, said generator comprising a master brake cylinder and a vacuum brake force booster coupled upstream thereof, a vacuum operated counter-force generator means for generating a restoring force acting in a direction opposite the brake applying force, and a hydraulic force converting means for increasing the restoring force, said counter-force generator and said hydraulic force converting means being provided in the path of transmission of the brake applying force to the brake force booster and a working piston of said counter-force generator means transferring the force exerted thereon into a working chamber of said hydraulic force converting means.

2. A brake pressure generator according to claim 1 wherein an axially displaceable adjusting piston transmits the brake applying force to the brake force booster, and wherein the vacuum operated counter-force generator includes the working piston separates two chambers arranged so that in the release position of the counter-force generator there is a pressure equilibrium in the chambers and in the working position there is a pressure difference causing the counter-force, and piston means displaceable by said working piston, said piston means having an annular face extending into a working chamber of the hydraulic force converting means for generating a hydraulic pressure which acts on the actuating piston in the restoring direction.

3. A brake pressure generator according to claim 2 wherein the working piston of the counter-force generator and the piston means generating pressure in the working chamber of the force converter comprise a single member.

4. A brake pressure generator according to claim 2 wherein atmospheric pressure prevails in the two chambers of the counter-force generator in the release position thereof and wherein valve means is provided to connect the chamber of the counter-force generator adjacent the force-converting means to a vacuum source.

5. A brake pressure generator according to claim 2 wherein vacuum prevails in the two chambers of the counter-force generator in the release position thereof and wherein valve means is provided to connect the chamber of the counter-force generator remote from the force converting means to a pressure source.

6. A brake pressure generator according to claim 1 wherein the brake force booster, the master brake cylinder, the counter-force generator and the force converting means are formed as a single unit and include a central actuating piston disposed in a manner axially displaceable within a cylinder for transmitting a brake applying force to the brake force booster, the working piston being operatively associated with the counter force generator, an annular chamber formed around the periphery of said actuating piston and a hollow-cylindrical piston connected with the working piston of the counter-force generator, the hollow cylindrical piston extending into the annular chamber which chamber contains hydraulic fluid and serves as a working chamber of the hydraulic force converting means.

7. A brake pressure generator according to claim 6 including a check valve between the annular chamber and a pressure equilibrium reservoir, said check valve being held open in the release position of the counter-force generator by a stop on the hollow cylindrical piston and being closed by pressure in the annular chamber.

8. A brake pressure generator according to claim 6 wherein the transmission ratio of the force converting means at which the counter-force supplied through the hollow cylindrical piston is transferrable to the actuating piston, is between 1:2 and 1:5.

* * * * *